United States Patent [19]

Hanks

[11] Patent Number: 4,630,718
[45] Date of Patent: Dec. 23, 1986

[54] COUPLING CLUTCH/BRAKE AND HOUSING

[75] Inventor: James V. Hanks, Robbinsdale, Minn.

[73] Assignee: Horton Manufacturing Co., Inc., Minneapolis, Minn.

[21] Appl. No.: 697,495

[22] Filed: Feb. 1, 1985

[51] Int. Cl.⁴ ............................................. F16D 67/04
[52] U.S. Cl. ..................................................... 192/18 A
[58] Field of Search ................. 192/18 R, 18 A, 18 B, 192/70.2, 70.12, 85 A, 113 A, 12 C

[56] References Cited

U.S. PATENT DOCUMENTS

| | | |
|---|---|---|
| 2,028,500 | 1/1936 | Cook et al. |
| 2,415,181 | 2/1947 | Johnson |
| 2,421,493 | 6/1947 | Gerst |
| 2,633,218 | 3/1953 | Pielstick |
| 2,775,330 | 12/1956 | Schjolin et al. |
| 3,282,385 | 11/1966 | Snyder |
| 3,444,972 | 5/1969 | Carstensen et al. |
| 3,480,123 | 11/1969 | Anderson et al. |
| 3,554,341 | 1/1971 | Anderson |
| 3,667,581 | 6/1972 | Hanks ................................ 192/18 A |
| 3,710,902 | 1/1973 | Hansen |
| 3,770,087 | 11/1973 | Jaeschke |
| 4,060,158 | 11/1977 | Kikuchi |
| 4,142,425 | 3/1979 | Ahlen et al. |
| 4,160,498 | 7/1979 | Newton et al. |
| 4,425,879 | 1/1984 | Shadday et al. |
| 4,534,454 | 8/1985 | Brooks ................................ 192/18 A |

Primary Examiner—George H. Krizmanich
Attorney, Agent, or Firm—Peterson,Wicks,Nemer & Kamrath

[57] ABSTRACT

A coupling clutch/brake is shown in its most preferred form as including first and second hubs having first and second splined friction discs received thereon. The first friction disc is movable between the second friction disc and a stationary friction surface mounted to a housing by a piston reciprocally mounted to the housing and rotatably mounted to the first friction disc by a bearing mounted therebetween. The second friction disc is substantially prevented from sliding on the splines with the second hub. The splines between the second friction disc and the second hub allow the second friction disc to cant to compensate for axial angular misalignment of the first and second hubs. In its most preferred form, the housing has a unique construction and specifically includes three generally hemispherical components. The open ends of the first and second shells abut together to form a volume for the first and second friction discs. The open end of the third shell is received on an axially extending flange integral with the second shell. The piston is slidably received on the flange of the second shell and on the third shell.

17 Claims, 1 Drawing Figure

COUPLING CLUTCH/BRAKE AND HOUSING

CROSS REFERENCE

The present invention is a further improvement upon the rotational control apparatus which is the subject of U.S. patent application Ser. No. 06/630,374 filed July 12, 1984 in the names of Leonid Dayen and Charles D. Raines and assigned to Horton Manufacturing Co., Inc.

BACKGROUND

The present invention relates generally to rotational control apparatuses and particularly to coupling clutch/brakes and to rotational control apparatus housings.

It is often desireable to couple first and second mutually rotating parts such as shafts and to controllably rotatably relate them together. Coupling clutch/brakes can be utilized in these situations. However, coupling clutch/brakes can suffer from problems resulting from the horizontal and angular misalignment of the shafts.

Rotational control apparatuses such as clutch/brakes can also suffer from problems resulting from the number and complexity of components and especially of the housing and piston mounting components. The complexity of components further can result in expensive casting and assembly costs.

SUMMARY

The present invention solves these and other problems by providing in its most preferred form a coupling clutch/brake including first and second hubs for receipt of shafts. Further provided are first and second interface discs for slideable receipt on the first and second hubs, respectively. The first interface disc is selectively movable for the selective engagement between the second interface disc and a stationary interface surface. Although slideably mounted, the second interface disc is substantially prevented from sliding on the second hub for allowing canting of the second interface disc with respect to the second hub to take up angular misalignment of the first and second shafts.

The present invention also solves these and other problems by providing in its most preferred form a housing for a control apparatus including at least two shells. The open end of the second shell is received on a flange extending from the first shell in a direction opposite to the interface of the annular portion. The piston of the control apparatus is slidably mounted by the flange of the first shell and by the second shell.

It is thus an object of the present invention to provide a novel coupling clutch/brake.

It is thus an object of the present invention to provide a novel housing construction for a control apparatus.

It is further an object of the present invention to provide such a novel coupling clutch/brake which compensates for angular misalignment of the coupled shafts.

It is further an object of the present invention to provide such a novel coupling clutch/brake which compensates for horizontal misalignment of the coupled shafts.

It is further an object of the present invention to provide such a novel coupling clutch/brake which allows simplified housing and other component casting.

It is further an object of the present invention to provide such a novel coupling clutch/brake which provides selfbalancing of the frictional interface engagement surfaces.

It is further an object of the present invention to provide such a novel control apparatus housing allowing simplified castings.

It is further an object of the present invention to provide such a novel control apparatus housing allowing easy and rapid assembly.

It is further an object of the present invention to provide such a novel control apparatus housing which slidably mounts a piston structure directly thereon.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
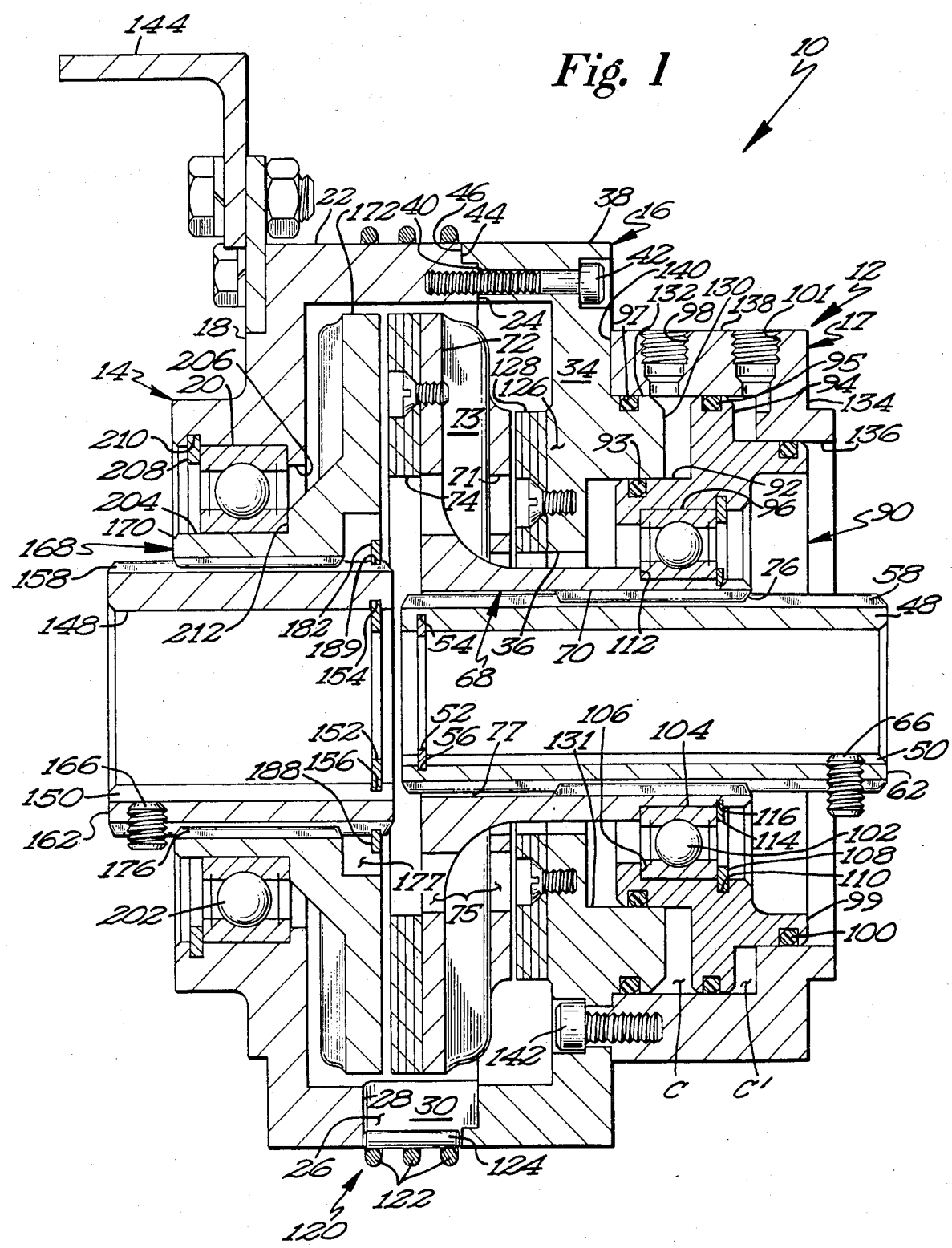
FIG. 1 shows a cross sectional view of a coupling clutch/brake constructed according to the teachings of the present invention.

The figure is drawn for ease of explanation of the basic teachings of the present invention only; the extensions of the figure with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the figure of the drawings, the same numerals designate the same or similar parts. Furthermore, when the terms "top", "bottom", "first", "second", "inside", "outside", "inward", "outward", and similar terms are used herein, it should be understood that these terms have reference only to the structure shown in the drawings as it would appear to a person viewing the drawings and are utilized only to facilitate describing the invention.

DESCRIPTION

A coupling clutch/brake according to the teachings of the present invention is shown in the drawings and is generally designated 10. Clutch/brake 10 includes a stationary housing 12 including in its most preferred form a first shell section 14, a second shell section 16, and a third shell section 17. First shell 14 includes a generally radially extending annular portion 18 having an inner edge terminating in a bearing mounting surface 20 and an outer edge terminating in a right angular or axially extending, annular flange 22. Flange 22 terminates in an annular edge 24 defining an open end. It can then be realized that shell 14 is generally bowl or semispherical in shape and can be inexpensively cast.

In its preferred form, openings 26 are formed in flange 22 of shell 14 extending inwardly from edge 24 and terminating in a spaced relation from the outer edge of annular portion 18. In its most preferred form, openings 26 are generally U-shaped extending from edge 24 terminating in edge 28 which is parallel to edge 24 and having first and second side edges 30 extending generally perpendicular to edges 24.

Second shell 16 includes a generally radially extending annular portion 34 having an inner cylindrical edge 36 and an outer edge terminating in a right angular and axially extending, annular flange 38. Flange 38 terminates in an annular edge 40 defining an open end. Shells 14 and 16 are secured together with edges 24 and 40 of flanges 22 and 38, respectively, abutting together to form a volume for receipt of the frictional interfaces of clutch/brake 10. In its most preferred form, shells 14 and 16 are secured by bolts 42 extending through flange 38 of shell 16 and threadably received in flange 22 of shell 14 between openings 26. Further, in its most preferred form, edge 40 includes an axially extending shoulder 44 and edge 24 includes a removed portion 46 complementary to and for receipt of shoulder 44. Thus, portion 46 and shoulder 44 provide an interlocking relation between shells 14 and 16.

The surface of portion 34 facing portion 18 of shell 14 further includes an interface shown as a mount 126 for a friction ring 128 for purposes to be explained further hereinafter. Additionally, portion 34 further includes a right angular and axially extending, annular flange 130 extending from the surface of portion 34 opposite to portion 18 and extending in a direction opposite to flange 38. In its most preferred form, flange 130 includes a radially inward axially extending surface 131 and a radially outward axially extending surface 132. It can then be realized that shell 16 is also generally bowl or semi-spherical in shape and can be inexpensively cast.

Shell 17 includes a generally radially extending annular shell portion 134 having an inner cylindrical edge 136 and an outer edge terminating in a right angular and axially extending annular flange or shell portion 138. Flange 138 terminates in an annular edge 140 defining an open end. It can then further be realized that shell 17 is generally bowl or semi-spherical in shape and can be inexpensively cast. Flange 138 has a size and shape complementary to and for receipt on flange 130 of shell 16 with edge 140 abutting against portion 34 of shell 16. In its most preferred form, shells 16 and 17 are secured together by bolts 142 which extend through portion 34 of shell 16 and which are threadably received in flange 138 of shell 17. Suitable provisions 144 may be provided for anchoring housing 12 to prevent rotation thereof and of friction ring 128 mounted to shell 16.

Clutch/brake 10 further includes a hub 48 for receiving a shaft not specifically shown. Suitable keyway means 50 can further be provided for preventing relative rotation between the shaft and hub 48. A retainer ring 52 such as a snap ring can further be provided in a radially extending cavity 54 for preventing the shaft from going in too far. Keyway 50 can further include a radially extending cavity 56 formed on the outside surface for receipt of retainer ring 52 for holding keyway 50 in the desired position and preventing axial movement.

Splines 58 are formed on the outside surface of hub 48. In its most preferred form, set screws 66 are provided adjacent the axially outward end 62 of hub 48 and which abut with the shaft and the keyway 50 for removably securing the shaft in hub 48.

Clutch 10 further includes a first member shown as driven friction interface disc 68 including a hub portion 70, a first, radially extending interface 72, and a second, radially extending interface 71 held in a spaced relation from interface 72 by radially spaced webs 73. It can then be appreciated that cooling air may pass between interfaces 71 and 72 for increasing the transfer of heat generated as the result of frictional engagement. In its most preferred form, interfaces 71 and 72 include radially spaced and axially aligned apertures 75 located intermediate webs 73 allowing insertion of tools for removing or securing friction ring 128 to mount 126. In its most preferred form, interface 71 of friction disc 68 frictionally engages with friction ring 128 of shell 16. In its most preferred form, a friction ring 74 is mounted to interface 72 of friction disc 68.

Hub portion 70 includes splines 76 complementary to and for sliding receipt on splines 58 of hub 48. In its most preferred form, splines 76 extend from the axially outward end of hub portion 70 to a point intermediate the length of friction disc 68, and a removed portion 77 having a diameter slightly greater than the diameter of splines 58 extends from the axially inward end of friction disc 68 to the axially inward end of splines 76.

For purposes of sliding friction disc 68 on splines 58, a piston 90 is further provided slideably mounted to shells 16 and 17 of housing 12. In its most preferred form, piston 90 is annular having an L-shaped body portion and includes a first axially extending, annular leg 92 and a second radially extending, annular leg 94. A bearing mount 96 is formed on the radially inward surface of leg 92. The radially outward surface of leg 92 abuts with and slides along the radially inward surface 131 of flange 130 of shell 16. Suitable sealing means 93 can be provided between surface 131 and the radially outward surface of leg 92 such as an O-ring seated on the radially outward surface of leg 92. The free end of leg 94 abuts with and slides along flange 138 of shell 17. Suitable sealing means 95 can be provided between the free end of leg 94 and flange 138 such as an O-ring seated in the free end of leg 94. Further, suitable sealing means 97 can be provided between the radial outward surface 132 of flange 130 of shell 16 and the radial inward surface of flange 138 of shell 17 such as an O-ring seated in surface 132 of shell 16 as shown. Thus, a cylinder C is formed by and between flange 130 of shell 16, flange 138 of shell 17, and legs 92 and 94 of piston 90. Suitable provisions 98 are provided for supplying fluid pressure to cylinder C.

In its most preferred form, piston 90 further includes a third, axially extending leg 99 extending from leg 94 generally parallel to but in the opposite direction from leg 92 to form a generally T-shaped cross section. In its most preferred form, leg 99 is located generally intermediate the length of leg 94. The radially outward surface of leg 99 abuts with and slides along edge 136 of shell 17. Suitable sealing means 100 can be provided between leg 99 and edge 136 such as an O-ring seated on the radially outward surface of leg 99. Thus, a further cylinder C' is formed by and between annular portion 134 and flange 138 of shell 17 and legs 94 and 99 of piston 90. Suitable provisions 101 are provided for supplying fluid pressure to cylinder C'.

Piston 90 is rotatably mounted by a bearing 102 located between mount 96 of piston 90 and bearing mount 104 formed on friction disc 68. In its most preferred form, the outer race of bearing 102 is captured between a shoulder 106 extending radially from mount 96 and a retaining ring 108 received in a cavity 110 extending radially into mount 96. The inner race of bearing 102 is captured between a shoulder 112 extending radially outward from mount 104 of friction disc 68 and a retaining ring 114 received in a cavity 116 extending radially into mount 104 of friction disc 68.

Thus, it should be appreciated that bearing 102 rotatably mounts shells 16 and 17 of housing 12 and piston 90 with respect to hub 48 and friction disc 68. Further, it should be noted that piston 90 and friction disc 68 are slideable with respect to shells 16 and 17 of housing 12 and with respect to hub 48. Specifically, if fluid pressure is introduced through provision 98 into cylinder C, piston 90 slides on shells 16 and 17 of housing 12 into its first axial position. Due to their common connection with bearing 102, friction disc 68 slides along hub 48 by splines 76 and 58 with piston 90 movement. Likewise, if fluid pressure is introduced through provisions 101 into cylinder C', piston 90 slides on shells 16 and 17 of housing 12 for sliding friction disc 68 along hub 48 on splines 76 and 58 in the opposite direction into its second axial position. Thus, piston 90 and friction disc 68 are axially interrelated, i.e., maintain the same axial position with respect to each other, but are rotatably independent from each other.

Clutch/brake 10 further includes a hub 148 for receiving a shaft not specifically shown. Suitable keyway means 150 can further be provided for preventing relative rotation between the shaft and hub 148. A retainer ring 152 such as a snap ring can further be provided in a radially extending cavity 154 for preventing the shaft from going in too far. Keyway 150 can further include a radially extending cavity 156 formed on the outside surface for receipt of retainer ring 152 for holding keyway 150 in the desired position and preventing axial movement.

Splines 158 are formed on the outside surface of hub 148. In its most preferred form, set screws 166 are provided adjacent the axially outward end 162 of hub 148 and which abut with the shaft and the keyway 150 for removably securing the shaft in hub 148.

Clutch/brake 10 further includes a second member shown as drive friction interface disc 168 including a hub portion 170 and a radially extending interface 172. In its most preferred form, interface 172 of friction disc 168 frictionally engages with friction ring 74 of friction disc 68. Hub portion 170 includes splines 176 complementary to and for sliding receipt on splines 158 of hub 148. In its most preferred form, hub portion 170 includes a removed portion 177 at its radially and axially innermost corner.

Shell section 14 of housing 12 is rotatably mounted by a bearing 202 located between mount 20 of section 14 and bearing mount 204 formed on friction disc 168. In its most preferred form, the outer race of bearing 202 is captured between a shoulder 206 extending radially from mount 20 and a retaining ring 208 received in a cavity 210 extending radially into mount 20. The inner race of bearing 202 abuts with a shoulder 212 extending radially outward from mount 204 of friction disc 168. Thus, it should be appreciated that bearing 202 rotatably mounts shell 14 of housing 12 with respect to hub 148 and friction disc 168.

Friction disc 168 is prevented from moving beyond a first position in a first axial direction by retaining ring 208 and is prevented from moving beyond a second position in the opposite axial direction by a retaining member 182. Member 182 is shown in its most preferred form as a retaining ring 188 received in a radially extending cavity 189 formed in the outside surface of hub 148.

It should then be noted that when it is necessary to couple first and second shafts as in the present invention, the shaft axes are often horizontally misaligned as well as angularly misaligned. Problems arising from misalignment of the shafts are especially prone in rotational control apparatuses which couple first and second shafts and where independently rotating parts connected to the respective shafts interface or mate such as by frictionally engaging with each other to rotationally control or relate the shafts with respect to each other.

The present invention solves this problem by providing a splined connection between friction disc 168 and hub 148 even though sliding of friction disc 168 is undesirable and is substantially prevented from sliding beyond a first position by retaining ring 208. Specifically, the splined connection between friction disc 168 and hub 148 allows the friction disc 168 to cant in regard to hub 148 due to the float or play allowed by splines 158 and 176. Particularly, when fluid pressure is introduced into cylinder C' through provisions 101, piston 90 moves in the axial direction towards friction disc 168 moving friction ring 74 of friction disc 68 to engage with friction disc 168. However, if the shafts received within hubs 48 and 148 are angularly misaligned, friction ring 74 will engage friction disc 168 at an angle thereto making a single point contact rather than around the entire circumference of friction ring 74. Thus, the friction engagement surface is greatly reduced resulting in disadvantageous operation including greater slippage causing higher heat generation, excessive wear of friction ring 74 and friction discs 68 and 168, and reduced torque transfer. In the present invention if friction ring 74 makes a single point contact with friction disc 168, friction disc 168 will cant to mate with friction ring 74 around its entire circumference due to the splined connection of friction disc 168. Furthermore, removed portion 177 of friction disc 168 further enhances the ability of friction disc 168 to cant on hub 148 to allow mating of discs 68 and 168 around their entire circumference. Utilizing the present invention, in the range of three-fourths of a degree angular misalignment can be taken up or compensated for by clutch/brake 10 according to the teachings of the present invention.

Additionally, according to the teachings of the present invention, utilizing air or other fluid to move the piston, rather than electricity, also compensates for shaft axial misalignment. Specifically, the sealing members shown in its most preferred form as O-rings 93, 95, and 100 of piston 90 allow slop in O-rings 93, 95, and 100 and the manufacturing tolerances allowed for shells 16 and 17 of housing 12 and piston 90. Thus, if friction ring 74 makes a single point contact with friction disc 168 due to the angular misalignment of the shafts within hubs 48 and 148, friction disc 68 upon which friction ring 74 is mounted may cant on hub 48 to allow mating of friction ring 74 and friction disc 168 around its entire circumference. Likewise, if interface 71 of friction disc 68 makes a single point contact with friction ring 128 due to the angular misalignment of the shaft within hub 48 and housing 12, friction disc 68 may cant on hub 48 to allow mating of friction ring 128 and interface 71 of friction disc 68 around their entire circumference.

It can further be realized that removed portion 77 of friction disc 68 further enhances the ability of friction disc 68 to cant on hub 48 to allow mating of friction disc 68 with friction disc 168 or friction ring 128 around its entire circumference. Specifically, due to the enlongated length of friction disc 68 and the length of removed portion 77 being generally equal to one half the length of friction disc 68, canting of friction disc 68 is greatly enhanced than if removed portion 77 had not been provided.

Therefore, due to the culminating effect of the splined connection of friction disc 168, removed portion 77, and the use of air to axially move piston 90, larger angular misalignment of the shafts within hubs 48 and 148 can be compensated for utilizing the teachings of the present invention.

Furthermore, the slop in O-rings 93, 95, and 100 and the manufacturing tolerances allowed for shells 16 and 17 of housing 12 and piston 90 also compensate for axial or horizontal misalignment. Specifically, if the shafts are not axially aligned, friction discs 68 and 168 will not rotate about the same axis resulting in an out of balance or non-concentric engagement of friction ring 74 with friction disc 168. Utilizing the present invention, friction disc 68 upon which friction ring 74 is mounted will self-align with respect to friction disc 168 due to the slop and tolerances of piston 90, shells 16 and 17, and O-rings 93, 95, and 100 such that a concentric, balanced frictional engagement occurs between friction ring 74 and friction disc 168. In the preferred embodiment, friction disc 68 will move radially in the range of 0.005 inch in providing for frictionally engaging self-alignment in the case of shaft axial misalignment.

It should also be noted that clutch/brake 10 also has an advantageous construction. Specifically, conventional clutch/brakes included the output rotatably mounted directly to the input by bearings. Such construction allows a path for power flow that can bypass the torque and/or rotational selective interface in the event of failure of the bearing between the input and output. In clutch/brake 10 according to the teachings of the present invention, the input and output are rotatably mounted together by a stationary housing and are not rotatably mounted directly to each other. Therefore, no possible bypass paths are created such that power flow can occur between hubs 48 and 148 in the event of bearing failure and seizure as in conventional clutch/brakes. The prevention of undesired rotation of the output caused by power flow bypassing the rotational interface of the control apparatus as the result of bearing failure is an important advantage over prior clutch/brakes. Specifically, such undesired rotation is usually unexpected and often produces catastrophic results possibly damaging the machine being powered by the output of the clutch/brake, the work piece in the machine, and/or body parts of the operator located in the machine. This is especially important when it is desired to have the output always come to the same degrees of registry with the input, such as when the clutch/brake utilizes an interface of the type and/or variety of U.S. Pat. No. 3,760,916.

It should be realized that a single, double-acting piston 90 of the type of the present invention is advantageous over prior two-piston systems utilized in many prior clutch/brakes. Specifically, interfacing the output simultaneously with both the input and the stationary brake housing as may occur in two-piston systems is eliminated since interface in clutch/brake 10 of the present invention is controlled by the location of a single piston and thus the output can only be interfaced with one of the input and the stationary brake housing.

Clutch/brake 10 according to the preferred embodiment of the present invention further includes a guard 120. Guard 120 includes a guard appliance shown in its most preferred form as a plurality of circumferential ring members 122 having a diameter generally equal to but slightly larger than the outside surface of flange 22 and for sliding receipt on the outside surface of flange 22. Ring members 122 are held in spaced relation by axially extending, cross braces or bars 124 located interiorly of rings 122 at the circumferential spacing of and for receipt within openings 26 of flange 22 of shell 14 of housing 12. In its most preferred form, bars 124 have an axial length generally equal to the length of openings 26 between edges 24 and 28.

During assembly of clutch/brake 10 and before shells 14 and 16 are put together, guard 120 is placed on shell 14. Specifically, ring members 122 are placed on flange 22 of shell 14 and bars 124 are located within openings 26 until its end abuts with edge 28. It can then be realized that guard 120 is self-aligning due to the positioning of bars 124 with openings 26 and guarantees a unique rotational relation of guard 120 with respect to shell 14. Shell 16 can be positioned and secured to shell 14 by bolts 42. It can then be realized that the opposite end of bars 124 will then abut with shoulder 44 of edge 40 of shell 16. It can then be appreciated that ring members 122 and guard 120 are held and retained in position on shell 14 and housing 12 by the abutting relation of bars 124 with edge 28 and shoulder 44.

It can then be appreciated that guard 120 of the present invention includes several other unique, advantageous features. Specifically, guard 120 is self-maintained or self-contained in that no assembly of guard 120 is required during assembly of rotational control apparatus 10, but rather guard 120, as a unitary member, is simply slipped in place on shell 14 during assembly of rotational control apparatus 10. Additionally, no tools are required during placement of guard 120 on rotational control apparatus 10. Further, guard 120 cannot be removed without disassembly of shells 14 and 16 of apparatus 10.

It can further be appreciated that rotational control apparatus such as clutch/brake 10 of the present invention require openings in housing 12 for air flow for cooling and other purposes. However, OSHA standards require that the distance of the housing openings be less than one-fourth of an inch when rotating parts are located within the housing as in the case of rotational control apparatus. Guard 120 meets this OSHA standard and allows openings 26 of housing 12 to be of a large size. Particularly, if housing 12 were itself cast to include openings that met the OSHA standards, the expenses involved would be great. However, using guard 120, which is non-removeable without the disassembly of housing 12, allows openings 26 to be made of a large size, reducing the casting costs of housing 12 while utilizing guard 120, which can be manufactured and assembled on clutch/brake 10 at a relatively low cost, to meet the OSHA standard.

It should be noted that housing 12 also has an advantageous construction according to the teachings of the present invention. Specifically, housing 12 includes three shells 14, 16, and 17 which are bolted together to form volumes for the rotation and/or torque interface of clutch/brake 10 and for the components which actuate the rotation and/or torque interface. Further, shells 16 and 17 slidably mount piston 90 which actuates the rotation and/or torque interface according to the teachings of the present invention without requiring additional components and structure. Furthermore, in its most preferred form, piston 90 and shells 16 and 17 form fluid pressure cylinders C and C' according to the teachings of the present invention without requiring additional components and structure. Additionally, shells 14, 16, and 17 are generally bowl shaped and thus can be easily and very economically cast. It can then be appreciated that housing 12 constructed according to the teachings of the present invention significantly reduces the number and complexity of the control apparatus such as in the clutch/brake of the type of the preferred embodiment of the present invention. Likewise, clutch/brake 10 utilizing housing 12 according to the teachings of the present invention is very axially as well as radially compact. As a further result, assembly of the control appararus is greatly simplified reducing the costs for both manufacture and assembly. Furthermore, due to reduced number and complexity of the components of the control apparatus, the apparatus is less prone to breakdown and failure. Thus, housing 12 according to the teachings of the present invention results in many advantages over prior control apparatus, some of which are set forth hereinbefore.

Now that the basic teachings of the present invention have been explained, many extensions and variations will be obvious to one having skill in the art. For example, it can be appreciated that clutch/brake 10 can be utilized to couple shafts having different diameters as shown in the drawings, with either the drive or driven shaft being of a smaller diameter or to couple shafts having the same diameters.

Further, although piston 90 is shown in its most preferred form as being movable in opposite directions by fluid pressure introduced into cylinder C or C', piston 90 may be movable by other methods and means. For example, piston 90 could be biased in one axial direction by springs extending between piston 90 and one of the shells 16 and 17.

Additionally, although clutch/brake 10 according to the preferred embodiment of the present invention utilizes friction discs 68 and 168 forming a friction interface between the input and output of the clutch/brake, it can be appreciated that an apparatus for controlling the rotation and/or torque transfer between an input and an output according to the preferred embodiment may be constructed utilizing other types and constructions of rotation and/or torque interfaces such as but limited to interfaces of the type and/or variety of U.S. Pat. No. 3,760,916.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Coupling clutch/brake comprising, in combination: a first hub; a second hub; a first, driven interface disc having a first interface and a second interface; means for slidably mounting the first driven interface disc on the first hub; a second, drive interface disc, with the second, drive interface disc being selectively relatable with the first interface of the first, driven interface disc to rotatably relate the first, driven interface disc and the second, drive interface disc; means for slidably mounting the second, drive interface disc on the second hub; a first shell section; means for holding the first shell section in a stationary, non-rotating position, a second shell section; means for interconnecting the first shell section to the second shell section; means for rotatably mounting the second shell section on the second, drive interface disc; with the first shell section including a radially extending annular portion and an axially extending, annular flange extending from the first shell section in a direction opposite from the second shell section, with the annular flange including a radially inward axially extending surface and a radially outward axially extending surface; a third shell section including an open end having a size and shape complementary to and for receipt on the outward axially extending surface of the annular flange of the first shell section; a piston reciprocally mounted on the radially inward axially extending surface of the annular flange of the first shell section and on the third shell section; means for reciprocally relating the piston and the first, driven interface disc and for rotatably mounting the piston with respect to the first, driven interface disc; means for reciprocating the piston between a first axial position where the first interface of the first interface disc is rotatably independent of the second interface disc and the second interface of the first interface disc rotatably relates with the radially extending annular portion of the first shell section and a second axial position where the first interface of the first, driven interface disc engages with the second interface disc and the second interface of the first interface disc is rotatably independent of the radially extending annular portion of the first shell section; wherein the piston and the shell sections have tolerances allowing the canting of the first, driven interface disc with respect to the first hub to take up horizontal misalignment of the first and second hubs and wherein the second, drive interface disc slidably mounting means allow canting of the second, drive interface disc with respect to the second hub to take up angular misalignment of the first and second hubs.

2. The coupling clutch/brake of claim 1 wherein the reciprocally relating and rotatably mounting means comprises a bearing located between the first, driven interface disc and the piston.

3. The coupling clutch/brake of claim 1 wherein the piston reciprocating means comprises, in combination: at least one cylinder for receipt of fluid pressure for reciprocating the piston.

4. The coupling clutch/brake of claim 1 wherein the third shell section is annular is shape having a radially extending annular portion having a first cylindrical open edge and a second edge terminating in a first end of an axially extending shell portion, with the open end of the third shell section located on the axially extending shell portion opposite to its first end; with the piston being annular in shape having a generally T-shape and including an L-shaped body portion having a first leg and a second leg and a third leg extending from the second leg in a direction opposite to the first leg; with the second leg having a free end, with the first leg being slidable on the radially inward axially extending surface of the first shell section; with the third leg being slidable on the first cylindrical open edge of the radially extending annular portion of the third shell section; and with the free end of the second leg being slidable on the axially extending shell portion of the third shell section.

5. The coupling clutch/brake of claim 4 wherein the piston reciprocating means comprises, in combination: a first cylinder for receipt of fluid pressure for reciprocating the piston defined by the first shell section, the axially extending shell portion of the third shell section, and the first and second legs of the piston.

6. The coupling clutch/brake of claim 4 wherein the piston reciprocating means comprises, in combination: a first cylinder for receipt of fluid pressure for reciprocating the piston defined by the third shell section and the second and third legs of the piston.

7. The coupling clutch/brake of claim 4 wherein the piston reciprocating means comprises, in combination: a first cylinder for receipt of fluid pressure for reciprocating the piston defined by the first shell section, the axially extending shell portion of the third shell section, and the first and second legs of the piston; and a second cylinder for receipt of fluid pressure for reciprocating the piston defined by the third shell section and the second and third legs of the piston.

8. Control apparatus for rotatably relating a first member with one of a second member and a housing comprising, in combination: a first interface and a second interface formed on the first member; an interface formed on the second member; a first, bowl-shaped housing shell including a radially extending annular portion having an outer edge terminating in a first, axially extending flange, with the radially extending annular portion having an interface for selective engagement with the first interface of the first member; a second, axially extending flange radially spaced from the first, axially extending flange and extending from the radially extending annular portion of the first housing shell opposite to the interface of the radially extending annular portion; with the second flange including a radially inward surface and a radially outward surface; a second, bowl-shaped housing shell having an open end having a size and shape complementary to and for receipt on the radially outward surface of the second flange; a third, bowl-shaped housing shell including a radially extending annular portion having an outer edge terminating in a third, axially extending flange; means for rotatably mounting the third housing shell on the second member; means for interconnecting the first and third housing shells with the first and third flanges abutting together; a piston slidably mounted on the radailly inward surface of the second flange of the first housing shell and on the second housing shell; means for reciprocally relating the piston and the first member and for rotatably mounting the piston with respect to the first member; means for reciprocating the piston on the radially inward surface of the second flange of the first housing shell and on the second housing shell between a first axial position wherein the first interface of the first member interfaces with the interface of the first housing shell and the second interface of the first member is independent of the interface of the second member and a second axial position wherein the first interface of the first member is independent of the interface of the first housing shell and the second interface of the first member interfaces with the interface of the second member.

9. The control apparatus of claim 8 wherein the second housing shell includes an axially extending annular shell portion; wherein the piston has an L-shape and includes a first leg and a second leg having a free end, with the first leg being slidable on the radially inward surface of the flange and with the free end of the second leg being slidable on the axially extending annular shell portion of the second housing shell; wherein the piston reciprocating means comprises, in combination: a first cylinder for receipt of fluid pressure for reciprocating the piston defined by the second, axially extending flange of the first housing shell, the axially extending annular shell portion of the second housing shell, and the first and second legs of the piston.

10. The control apparatus of claim 9 wherein the second housing shell further includes a radially extending annular shell portion having an inner cylindrical open edge and an outer edge terminating in the axially extending annular shell portion; wherein the piston is generally T-shaped and further includes a third leg extending from the second leg in a direction opposite to the first leg and slidable on the inner cylindrical open edge of the second housing shell; and wherein the piston reciprocating means further comprises, in combination: a second cylinder for receipt of fluid pressure for reciprocating the piston defined by the second housing shell and the second and third legs of the piston.

11. The control apparatus of claim 9 wherein the piston reciprocally relating and rotatably mounting means comprises, in combination: a bearing located between the first leg of the piston and the first member.

12. The control apparatus of claim 8 wherein the interfaces of the first and second members comprise friction discs.

13. The control apparatus of claim 8 wherein the first, axially extending flange of the first housing shell terminates in an annular edge, with the annular edge abutting with the third housing shell in the interconnected relation, with the first flange having an outer diameter; circumferentially spaced cooling air openings extending axially from the annular edge of the first flange of the first housing shell; guard means for allowing entry of cooling air into the cooling air openings, for preventing entry of a finger into the cooling air openings, and for preventing its removal without the disassembly of the first and third shell sections from each other, with the guard means comprising, in combination: a plurality of circumferential ring members having a shape and an inner diameter substantially equal to but slightly larger than the outer diameter of the first flange and for receipt thereon; and cross braces for holding the ring members in a spaced relation, with the cross braces being secured on the inner diameter of the ring members in circumferentially spaced relation corresponding to and for receipt within the cooling air openings.

14. The control apparatus of claim 13 wherein the length of the cross braces is generally equal to the axial extent of the cooling air openings, wherein the cross braces are captured between the third housing shell and the axial extent of the cooling air openings.

15. The control apparatus of claim 8 further comprising, in combination: a first hub; and means for slidably mounting the first member on the first hub, with the first member including a hub poriton having an axially outward end and an axially inward end, with the first and second interfaces of the first member extending radially from the hub portion, with the slidably mounting means comprising splines formed on the hub portion for sliding receipt on splines formed on the first hub, with the splines of the hub portion extending from the axially outward end of the hub portion to a point intermediate the length of the hub portion; and a removed portion formed in the hub portion extending from the axially inward end of the hub portion to the splines of the hub portion and having a diameter slightly greater than the splines of the first hub for enhancing the ability of the first and second interfaces to cant with respect to the first hub to interface with the interfaces of the second member and the first housing shell.

16. The control apparatus of claim 15 further comprising, in combination: a second hub; and means for slidably mounting the second member on the second hub allowing the second member to cant with respect to the second hub to take up angular misalignment of the first and second members.

17. The control apparatus of claim 8 further comprising bolts extending axially through the radially extending annular portion of the first housing shell and threadably received in the open end of the second housing shell simplifying assembly of the control apparatus.

* * * * *